Fig. 2

INVENTORS.
CORNELIUS C. COFFIELD
BY HARRY R. GREENE
Barthel + Bugbee
ATTORNEYS.

Jan. 1, 1963 C. C. COFFIELD ET AL 3,071,241
RULE-INSERTING ARRANGEMENT FOR LINE-CASTING MACHINES
Filed Sept. 14, 1959 7 Sheets-Sheet 4

INVENTORS.
CORNELIUS C. COFFIELD
BY HARRY R. GREENE
Barthel & Bugbee
ATTORNEYS.

United States Patent Office 3,071,241
Patented Jan. 1, 1963

3,071,241
RULE-INSERTING ARRANGEMENT FOR LINE-CASTING MACHINES
Cornelius Carson Coffield, Hialeah, and Harry R. Greene, Miami, Fla., assignors to The Miami Herald Publishing Company, Miami, Fla., a corporation of Florida
Filed Sept. 14, 1959, Ser. No. 839,939
15 Claims. (Cl. 199—61)

This invention relates to linecasting machines such as those known in the printing art as Linotype machines, and in particular, to rule-inserting devices for such machines.

Hitherto, in order to separate paragraphs of print containing separate information items, such as classified advertisements in newspapers, it has been necessary to manually insert a spacer, known in the printing art as a "rule." In the operation of such linecasting or typesetting machines, no provision has been made for automatically inserting such rules before each paragraph of type. To form a rule it has hitherto been possible in the linecasting machine itself to operate the matrix releasing mechanism and release a sufficient quantity of matrices to fill out a "dash" line" of whatever length is being set. When the machine is so operated, the matrices cooperatively cast a single cohesive rule line or spacer between paragraphs.

Hitherto, also, it has been customary to insert by hand previously fabricated rules in the form of bars of the proper lengths, widths and heights to properly space the paragraphs or separate items of information apart from one another. In either of these alternatives, the formation or manual insertion of rules or line spacers has been slow and expensive. The present invention provides a rule-inserting device for conventional linecasting machines which operates in timed relationship with the conventional mechanism of the machine to eject and drop a prefabricated line spacer or rule from a magazine into the galley before each paragraph or item of print it is desired to line space.

Accordingly, one object of this invention is to provide a rule-inserting device for linecasitng mahcines which operates in cooperation with the conventional linecasting mechanism of such a machine to eject and drop a prefabricated rule from a magazine into the proper position in the galley of type as it is cast.

Another object is to provide a rule-inserting device of the foregoing character which is operated automatically from information contained in a special code path of a previously-prepared tape of a conventional tape-controlled linecasting machine, such as the so-called Teletypesetter-operated linecasting machine wherein the conventional Teletypesetter operating unit initiates the line-inserting operation in response to the arrival of a code indication upon the operating tape of the Teletypesetter operating unit, so as to close a switch which in turn sets up the sequential operation of the line-inserting device of the present invention, without the necessity for attention upon the part of the operator of the machine.

Another object is to provide a rule-inserting device of the foregoing character which is adapted, when necessary, to insert a rule between successive lines of type, such as would be required in single-line classified advertisements in newspapers or in similar work in book or magazine printing.

Another object is to provide a rule-inserting device of the foregoing character wherein it is possible to insert a rule before the casting of the line of type beginning a given paragraph or item rather than after a minimum of two lines, thereby facilitating the casting of single line items, as stated above.

Another object is to provide a rule-inserting device of the foregoing character which is so arranged that the slug buffer or type slug moving lever is operated twice during each complete cycle of the line-casting machine, namely first for the insertion of the rule and second for the casting and insertion of the slug in the galley, thereby providing a double action for maintaining the slugs in upright positions in the galley.

Another object is to provide a rule-inserting device of the foregoing character which can be operated either automatically by a Teletypesetter operating unit or manually, as desired, and which is adaptable for attachment to any conventional type of Teletypesetter operating unit or linecasting machine.

Another object is to provide a rule-inserting device of the foregoing character which is adapted for attachment to and use with linecasting machines arranged for either single or double row galleys so as to insert rules, as desired, in either galley.

Other objects and advantages of the invention will become apparent during the course of the following description of the accompanying drawings, wherein.

*General Description*

Referring to the drawings in detail, FIGURES 1 to 6 inclusive show the adjacently-located portion of a conventional linecasting machine, generally designated 10, to which the rule-inserting unit, generally designated 11, of a rule-inserting device, generally designated 12, has been attached so as to eject and drop rules or line spacers 14 at desired locations in front of the line slugs 16 of type cast by the linecasting machine 10 and deposited in upper or lower galleys 18 and 20 mounted on the linecasting machine 10. The galleys 18 and 20 collectively form a double galley unit or assembly, generally designated 22, supported on inclined brackets 24 and 26 which in turn are bolted or otherwise secured to the frame, generally designated 28, of the linecasting machine 10.

Figure 7:
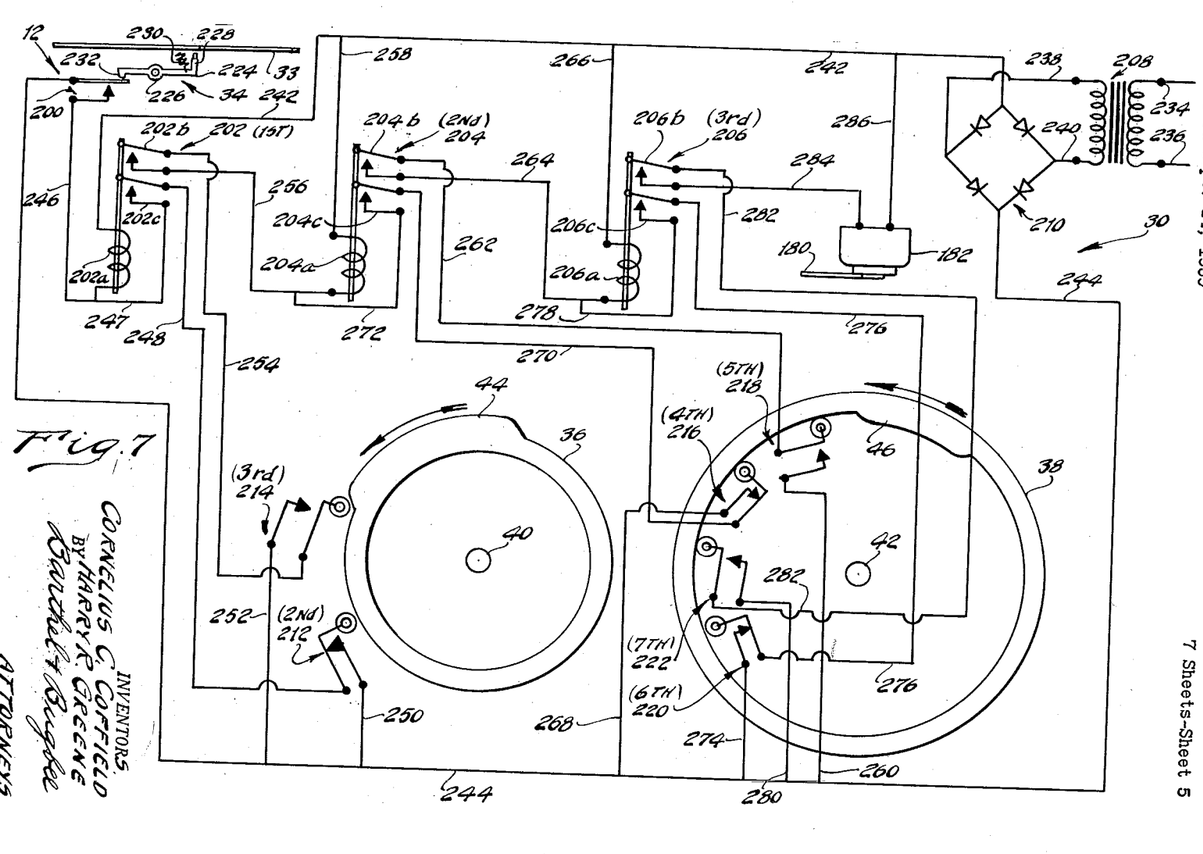
FIGURE 7 is a schematic wiring diagram of the electrical control circuit of the rule-inserting device of FIGURES 1 to 6 inclusive, showing diagrammatically a Teletypesetter operating unit tape and switch actuator, and also two switch-operating cams added to wheels or shafts conventionally present in the linecasting machine.
Figure 8:
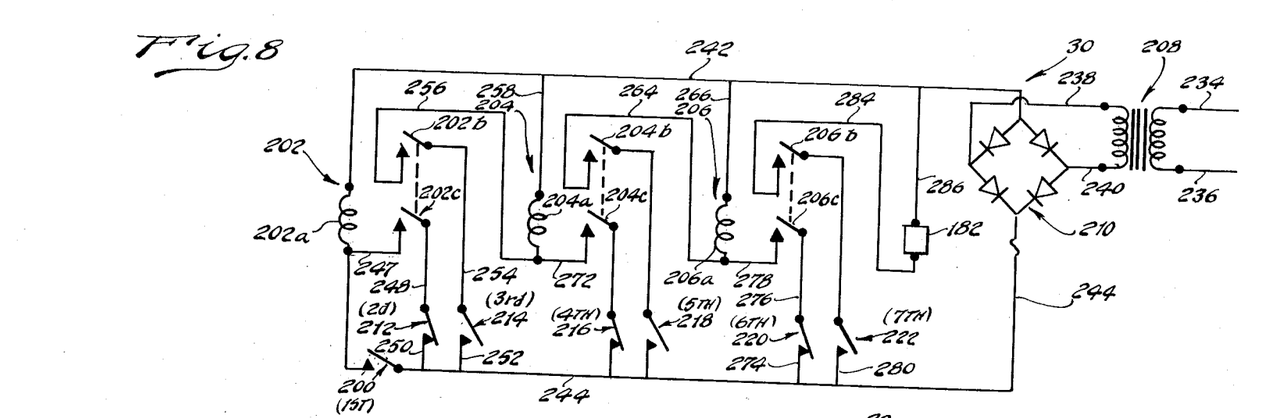
FIGURE 8 is a simplified schematic wiring diagram of that shown in FIGURE 7, with the Teletypesetter mechanism and cams omitted and with the relay switches out of alignment with their operating coils, the circuit being adapted for use with a linecasitng machine set up for alternate-cast molds feeding into alternate galleys.
Figure 9:
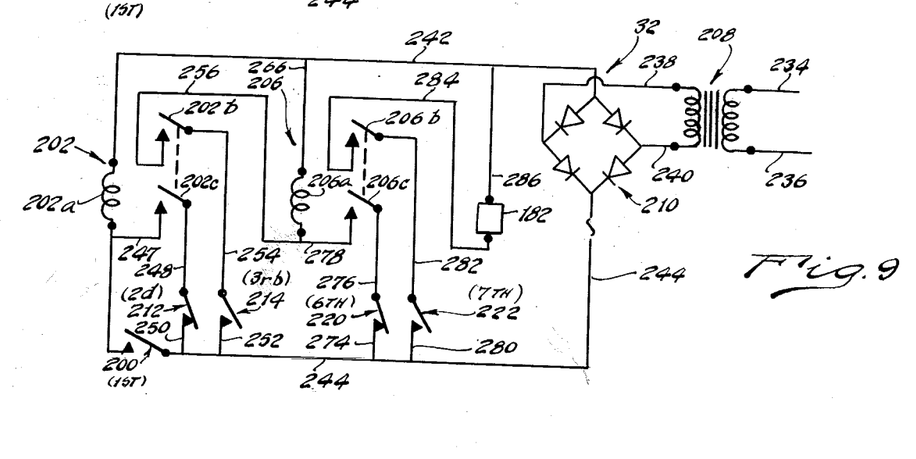
FIGURE 9 is a simplified schematic wiring diagram similar to that shown in FIGURE 8, but adapted for use with a linecasting machine set up for single-cast molds.
Figure 10:
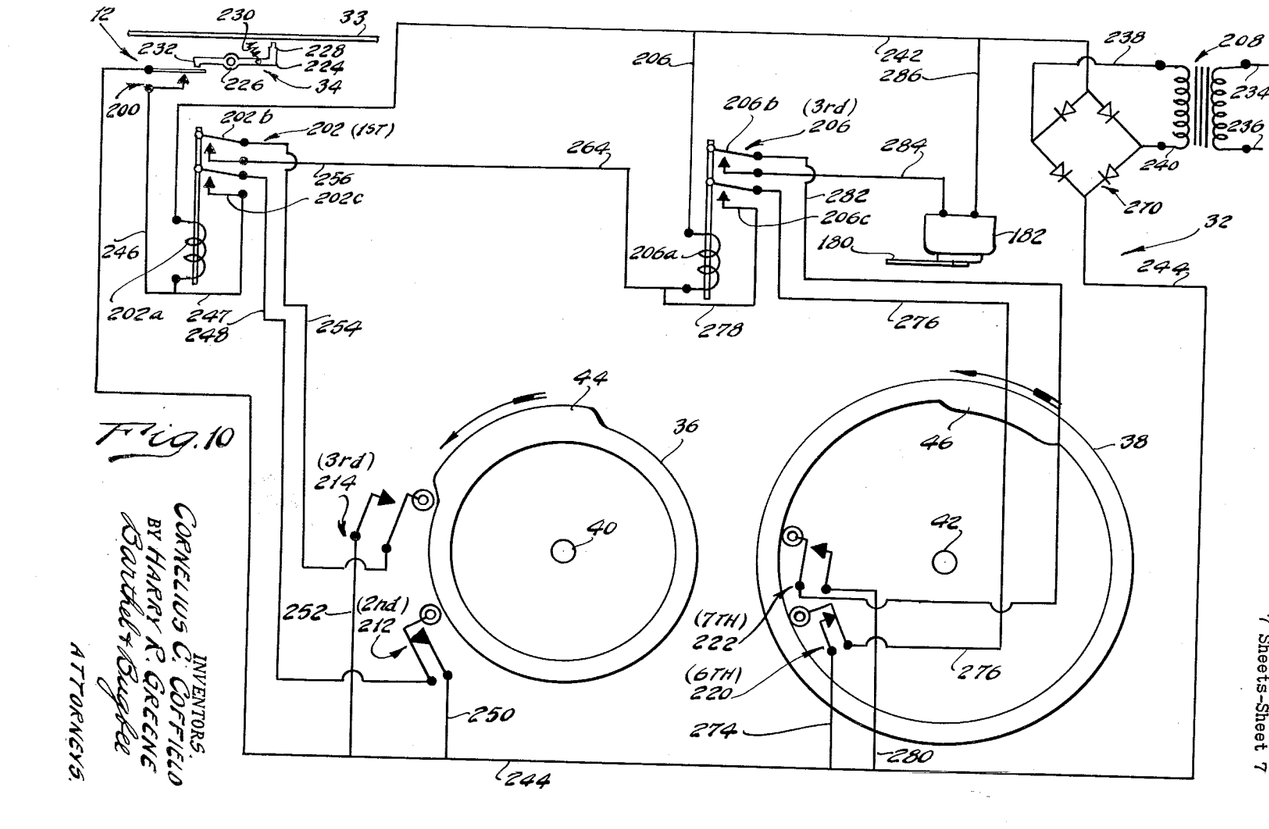
FIGURE 10 is a schematic wiring diagram of that shown in FIGURE 9, corresponding to that shown in FIGURE 7, but adapted for use with a linecasting machine set up for single-cast molds.

The rule-inserting unit 11 of the rule-inserting device 12 is controlled by the alternate-cast mold electrical control circuit, generally designated 30, as shown in FIGURES 7 and 8, or by the single-cast mold electrical control circuit, generally designated 32, shown in FIGURE 9. The operation of the rule-inserting device 12 is initiated either directly by the manual closing of a switch by the operator or, as shown in the upper left-hand corner of FIGURE 7, from coded perforations in the tape 33 of a conventional Teletypesetter operating unit, generally designated 34 and described in more detail below. The wiring diagram of FIGURE 7 differs from that of FIGURE 8 in showing the Teletypesetter operating unit 34, and in also showing two cam wheels 36 and 38. The special cam wheel 36 is mounted on the end of the so-called elevator cam shaft 40 regularly present in the conventional Teletypesetter operating unit 34. The cam wheel 38 is normally present for other purposes in the linecasting machine 10 and rotatably mounted on the "delivery and transfer cam" shaft 42 and is termed the "delivery and transfer cam."

The cam wheel 36 has a switch actuating portion 44 on the exterior thereof (FIGURE 7). The cam wheel 38 carries conventional cams which have been omitted to simplify the disclosure, these conventional cams operating the conventional delivery and transfer mechanism of the machine 10 as is known to those skilled in the linecasting machine art. Added to the cam wheel 38, however, for the purposes of the present invention, is a special arcuate internal cam portion 46.

The linecasting machine 10 (FIGURES 1, 2 and 3) is also customarily provided with a so-called first elevator 48 in the form of an elongated dovetail slide which has bevelled side or edge surfaces 50 which are reciprocable in angle guide blocks 52 (one only being shown) for conventional operation of other standard parts of the linecasting machine 10, as also described below. The guide blocks 52 are bolted or otherwise secured to the linecasting machine frame 28. The first elevator 48 toward its lower end is provided with an aperture 54 through which is seen (FIGURE 2) an elongated reciprocable cam, generally designated 56.

The elongated reciprocable cam 56 is bolted or otherwise suitably secured at 58 to the inner or rearward side of the first elevator 48, which is of approximately channel cross-section. The elongated reciprocable cam 56 (FIGURE 2) consists of a metal plate having a cam edge 60 including in succession an upper dwell portion 70 parallel to the axis of reciprocation of the first elevator 48, an upper low point 72, an upper inclined portion 74, a high point or crest 76, an inclined portion 78, a lower low point 80 and an elongated lower dwell portion 82 also disposed parallel to the axis of reciprocation of the first elevator 48 and aligned with the upper dwell portion 70.

Reciprocably mounted in the linecasting machine frame 28 for motion to and fro approximately horizontally is a conventional so-called slug buffer operating rod or link 84 for actuating a conventional slug buffer, generally designated 94. The link 84 is shifted once in each cycle, during normal operation of the conventional linecasting machine 10, but is actuated additionally by the elongated reciprocable cam 56 in accordance with the present invention. For this purpose there is bolted or otherwise secured to the link 84 an upstanding bracket plate 86 (FIGURE 2) carrying a horizontal axle 88 projecting perpendicularly forward from the bracket plate 86 in a direction also perpendicular both to the vertical axis of reciprocation of the first elevator or slide 48 and to the horizontal axis of reciprocation of the slug buffer operating link 84. Rotatably mounted on the axle 88 is a cam follower roller 90 engageable with the cam edge 60 for bringing about the special reciprocation of the slug buffer 94 referred to above.

The slug buffer operating link 84 is pivoted at 92 (FIGURE 2) to the conventional slug buffer 94 which in turn is pivotally mounted at its lower end upon the horizontal shaft 96 mounted in the linecasting machine frame 28. The slug buffer 94 is in the form of a bent arm or lever having an approximately vertical lower portion 98, an upwardly and forwardly inclined intermediate portion 100 and an upwardly directed bent or arcuate portion 102 terminating in a pusher head 104. The pusher head 104 is slightly inclined to conform to the upwardly and rearwardly inclined floor plate 106 of the galley unit 22 and has an intermediate notch 108 (FIGURE 1) which separates the upper galley pusher head portion 110 from the lower galley pusher head portion 112. These operate respectively in the trough-shaped upper and lower galleys 18 and 20. The notch 108 provides clearance for receiving the end of the elongated front side wall 114 of the upper galley 18 as the pusher head 104 reciprocates. Pivoted to the lower galley pusher head portion 112 is a finger 116, the end of which moves adjacent the elongated front side wall 118 of the lower galley 20.

Resting upon the floor plate 106 in each of the upper and lower galleys 18 and 20, and frictionally engaging the floor plate 106 is a follow-up block 120 (FIGURES 1, 2 and 3) having an angle spring clip 122 of sheet metal bolted thereto and overhanging its respective front side wall 114 or 118 in yielding frictional engagement therewith. The follow-up blocks 120 slide along their respective galleys 18 or 20 as the horizontal stack of vertical line slugs 16 of type cast by the machine 10 and the rules or line spacers 14 inserted therebetween (FIGURE 2) are pushed along their respective galleys 18 and 20 by the pusher head 104 of the slug buffer 94, as explained below in connection with the operation of the invention.

*Rule-Inserting Unit*

Bolted or otherwise secured to the front of the first elevator 48 is an inclined bar cam 124 which actuates the rule-feeding unit 11 in response to the vertical reciprocation of the first elevator 48. The rule-inserting unit 11 is bolted or otherwise secured to the front of an angle bracket 126 which in turn is bolted or otherwise secured to the frame 28 of the line-casting machine 10. Secured to the angle bracket 126 is one wall of a vertical rule magazine or chute 128. The rule magazine or chute 128 in its front wall has a vertical gap or slot 130 opening into a vertical magazine passageway 132 which is of the proper cross sectional dimensions to loosely and slidably accommodate a vertical stack of prefabricated rules or line slug spacers 14.

The rule magazine or chute 128 at its open lower end has a slot 134 (FIGURE 2) in its rear wall sufficiently high for the ejection of a single rule 14 but sufficiently low to prevent ejection of the rule 14 immediately above it. The rule magazine 128 in its front wall has a lower slot 136 which is lower than the vertical thickness of a rule 14. The major part of the lower end of the magazine 128 is closed by a base plate 138 (FIGURE 2) which is likewise secured to the angle bracket 126 and to which is secured an angle bar 140.

Mounted upon the vertical portion of the angle bar 140 is the vertical forward wall 142 of a tapered rule delivery hopper, generally designated 144, having at its lower end a rule delivery spout 148. The rearward wall 146 of the hopper 144 is inclined downwardly towards the hopper 148, which has therein a rule delivery passageway 149. The hopper 144 has opposite side walls 150 between which extends a horizontal rule-inverting rod 152 located immediately below and rearwardly of the rule delivery slot 134 in the rear wall of the rule magazine 128. In operation, the rule-inverting rod 152 intercepts the rearward edge of each rule or line slug spacer 14 and acts as a fulcrum around which the forward edge of the rule 14 swings downward so that the forward edge of each rule 14 always enters the rule delivery passageway 149 of the spout 148. The lower end or mouth of the rule delivery passageway 149 is positioned directly over the right hand end of one of the galleys 18 or 20, then in use. For purposes of example, the drawings show the upper galley 18 as the galley in use for the time being.

Reciprocably mounted on the bottom plate 138 (FIGURES 2 and 4 to 6) between guide strips 154 and held down by the retaining strips or bars 156 is a rule-ejecting slide 158. Bolted to the forward end of the slide 158 is a rule-ejecting plate 160 (FIGURE 2) which is of a width and height capable of passing through the front slot 136 and consequently of a thickness less than the thickness of one of the rules 14. The rule-ejecting slide 158 is drilled intermediate its forward and rearward ends to receive a movable spring anchorage pin 162 which extends downward through an elongated slot 164 in the bed plate 138. Secured to the movable pin 162 is the hooked rearward end of a tension slide-retracting spring 166, the hooked forward end of which is secured to a stationary anchor pin 168, the upper end of which is threaded into the suitably drilled and threaded bed plate 138 near its forward end.

Figure 1:
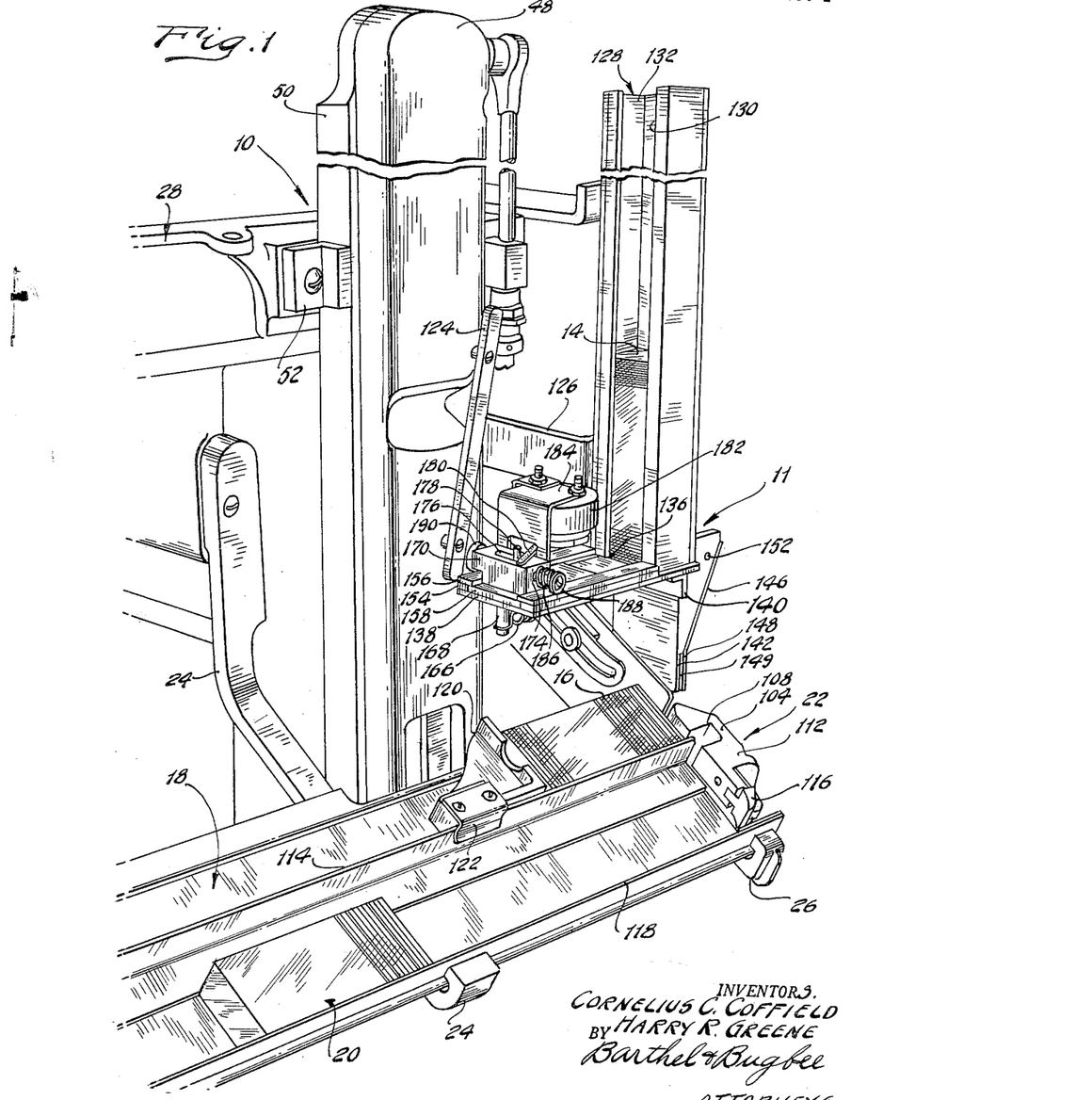
FIGURE 1 is a perspective view, looking downward obliquely from above, of a portion of a conventional linecasting machine with a double line-slug galley, showing a rule-inserting device attached thereto, according to one form of the invention, with the device in its retracted and deenergized position.

Bolted or otherwise secured to the upper side of the rule-ejecting slide 158 is a plunger guide block 170 which is bored transversely as at 172 to reciprocably support a slide-operating plunger 174 and which has at its top a vertical slot 176 through which projects a pin 178 seated in and perpendicular to the plunger 174, which is suitably drilled transversely for that purpose. The pin 178 is engaged by the laterally-swinging armature 180 of a conventional rotary solenoid 182 which is mounted upon and depends from an angle bracket 184 bolted to the rearward side of the plunger guide block 170. The energization of the rotary solenoid 182, as described below, swings its armature 180 clockwise to push the pin 178 and plunger 174 to the left (FIGURE 1). Upon de-energization of the rotary solenoid 182, the plunger 174 is retracted by a compression spring 186 disposed between the outer end of the block 170 and a washer 188 bolted to the outer end of the plunger 174.

Figure 5:
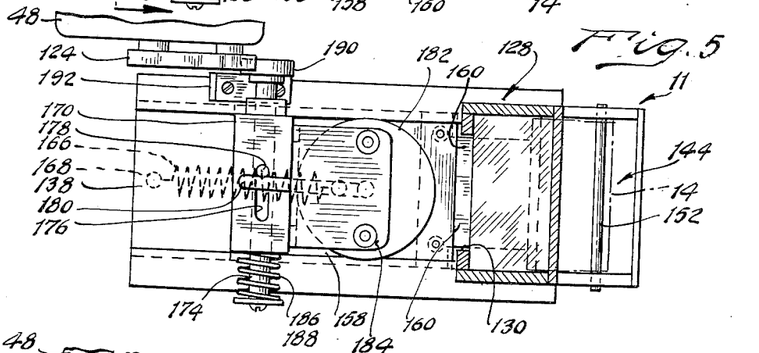
FIGURE 5 is a view similar to FIGURE 4 but with the rule ejector in its advanced or rule-ejecting position.
Figure 6:
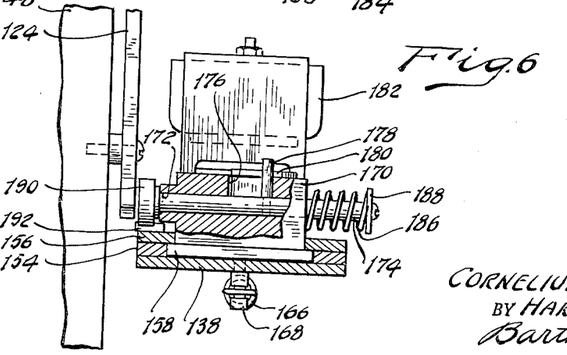
FIGURE 6 is a vertical cross section taken along the zig-zag line 6—6 in FIGURE 4.

Rotatably mounted upon the inner end of the plunger 174 (FIGURE 6) is a cam follower roller 190 which normally is held out of the path of travel of the inclined bar cam 124 by the compression spring 186 during de-energization of the solenoid 182 (FIGURE 6). Upon energization of the rotary solenoid 182 and consequent clockwise swinging of its armature 180, the plunger 174 pushes the roller 190 into the path of the bar cam 124, as shown in FIGURE 5, from its retracted position shown in FIGURES 4 and 6, as explained below in connection with the operation of the invention. Mounted on the rearward retaining strip 156 and rising therefrom in a position rearwardly of the roller 190 in the retracted position of the rule-ejecting slide 158 is a stationary longitudinal roller guide rib 192. The latter (FIGURE 5), upon advancement of the roller 190 into the path of the inclined bar cam 124 in response to energization of the solenoid 182, holds the roller 190 in its rearward or advanced position by engaging its forward side and temporarily preventing its retraction during reciprocation of the slide 158 by the engagement of the bar cam 124 with the follower roller 190, as explained below.

*Electrical Control Circuit Description*

The alternate-mold electrical control circuit 30 (FIGURES 7 and 8) in addition to the rotary solenoid 182 mentioned above, includes a first control switch 200, which is actuated either manually by a pushbutton or by the Teletypesetter operating unit 34 from the coded tape 33 as explained below. First, second and third relays 202, 204 and 206 respectively, a step-down transformer 208 for supplying control current of low voltage, and a conventional rectifier unit 210 for rectifying the low voltage alternating current supplied by the step-down transformer 208. Also provided in the control circuit 30 are second and third switches 212 and 214 respectively normally closed and normally open, and actuated in succession by the arcuate external cam 44 on the cam wheel 36. Further provided in the control circuit 30 and actuated in succession by the arcuate internal cam 46 on the cam wheel 38 are fourth and fifth switches 216 and 218 respectively normally closed and normally open, and sixth and seventh switches 220 and 222 also respectively normally closed and normally open. The showing of the switches 212 and 214 and the switches 216, 218, 220 and 222 below one another in an arcuate path is purely diagrammatic for the sake of clearly separating the various electrical lines interconencting them. In actual practice, the second and third switches 212 and 214 are mounted side by side as a pair, as are also the paired fourth and fifth switches 216 and 218, and likewise the paired sixth and seventh switches 220 and 222.

The Teletypesetter operating unit 34 is provided conventionally with so-called "bail switches," the number thereof being in excess of the number presently required for operating the machine but provided for possible future development and requirements. The Teletypesetter operating tape 33, for the same reason has additional paths that are not for conventional operation but are supplied to receive coded perforations to actuate future electrical circuits through the additional but temporarily unused excess bail switches. The first control switch 200 constitutes one such excess bail switch, as shown in the upper left-hand corner of FIGURE 7, and is actuated from the perforated coded Teletypesetter tape 33 by a switch-actuating lever 224 having a pivotal mounting 226 between its angled forward end 228 which is pulled upward by a tension spring 230 to enter the perforations in the tape 33 and its downwardly-angled rearward end 232 which actuates the switch blade of the normally-open bail switch 200.

Each of the three relays 2—2, 204 and 206 has an operating coil designated by the same numeral with the suffix "a," and two normally-open switches also designated with the same numeral with the added suffixes "b" and "c." The wiring is most conveniently described below in connection with the operation of the invention, in order to avoid unnecessary duplication.

The simplified operating circuit 32, for use with a single-cast mold set-up, is similar to that of the alternate-cast mold setup control circuit 30, with the exception of the fact that the second relay 204 and the fourth and fifth switches 216 and 218 connected to it are omitted, with slightly different results, as set forth in the description of the operation below.

For manual operation rather than Teletypesetter operation, the first control switch 200 is a push-button switch or other manual switch preferably located on the keyboard of the machine. The second and third switches 212 and 214 are then operated in response to the movement resulting from manually raising the assembling elevator of the machine rather than by a raising cam on the shaft 40. Other elements, circuit and functions remain substantially the same as described above.

*Operation of Alternate Mold-Casting Rule-Inserting Device*

In the operation of the alternate mold-casting rule-inserting device 12 (FIGURES 7 and 8), alternating current at a suitable voltage, such as 110 volts, is received from the power lines 234 and 236 within the primary winding of the step-down transformer 208 and is reduced to a suitable lower voltage alternating control current which flows from the secondary winding of the transformer 208 through the lines 238 and 240 to a conventional rectifier unit 210. From the rectifier unit 210 rectified alternating current flows through the control current supply lines 242 and 244 respectively to the remainder of the circuit 30, as described below. Control current from the rectifier 210 flows through the control current supply line 242 to the operating coil 202a of the first relay 202 and thence through the line 246 to the contacts of the bail switch 200. When the end 228 of the actuating lever 224 is pulled upward by the spring 230 to enter a code perforation in the Teletypesetter operating tape 33, which as stated above has been punched with coded perforations corresponding to the locations at which it is desired to insert rules 14, its opposite end 232 depresses the blade and closes the contacts of the normally-open main control switch or bail switch 200. The closing of the normally-open control switch or bail switch 200 completes the circuit and energizes the operating coil 202a of the first relay 202, by interconnecting the control current supply lines 242 and 244, thereby closing its normally-open relay switches 202c and 202b.

The closing of the lower switch 202c in turn closes a holding circuit from the coil 202a through the line 247, switch 202c and line 248, normally-closed second switch 212 and line 250. The closing of the upper switch 202b conditions the operating coil 204a of the second relay 204 for energization from control supply line 244 through the line 252, normally-open third switch 214 (about to be closed by the cam 44), line 254, now-closed upper relay switch 202b, line 256, second relay operating coil 204a, and line 258 to the control current supply line 242.

Meanwhile a line of type or slug has been cast by the line-casting machine 10 in its normal conventional operation and the assembling elevator of the line-casting machine is being raised by conventional mechanism including the rotary shaft 40. As the shaft 40 rotates in so doing the cam wheel 36 upon it swings the cam portion or projection 44 first into closing engagement with the normally-open third switch 214 and immediately thereafter into opening engagement with the normally-closed second switch 212. The closing of the normally-open third switch 214 completes the energization of the operating coil 204a of the second relay 204, closing its normally open relay switches 204b and 204c, and the latter action immediately thereafter de-energizes the operating coil 202a of the first relay 202, opening its normally-open relay switches 202b and 202c, assuming that the normally-open main switch 200 has meanwhile been released and its contacts opened following its first closing by the Teletypesetter operating unit 34 or manually by the operator, as the case may be.

In the foregoing manner, the second relay 204 is energized and the first relay 202 de-energized before the line-casting machine cams start on their cycle to cast a line of type or slug which is to have a rule or line spacer 14 to be inserted before it. Meanwhile, the internal cam portion 46 mounted on the delivery and transfer cam wheel 38 of the line-casting machine 42 has rotated to a location in the neighborhood of near 40 to 50 degrees of the first cycle of the line-casting machine 10, after the line of type has been sent in for casting, whereupon the cam portion 46 engages and closes the contacts of the normally-open fifth switch 218. This action thereby energizes the operating coil 206a of the third relay 206 from the control current supply line 244 by way of the line 260, the now-closed fifth switch 218, the line 262, the now-closed upper relay switch 204b of the second relay 204, the line 264, the third relay operating coil 206a, and the line 266 to the control current supply line 242, completing the circuit. This action closes the relay switches 206b and 206c of the third relay 206.

The continued rotation of the delivery and transfer cam 38 of the line-casting machine 10 now causes the internal cam portion 46 thereof to open the contacts of the normally-closed fourth switch 216 (FIGURE 7), thereby de-energizing the holding circuit of the second relay operating coil 204a by opening the circuit between the line 268 connected to the control current supply line 244 and the line 270 running by way of the second relay lower switch 204c and the line 272, the second relay operating coil 204a and the line 258 to the control current supply line 244. The consequent opening of the upper relay switch 204b opens the circuit between the lines 262 and 264, but the energization of the third relay operating coil 206a is now continued by a holding circuit established from the control current supply line 244 through the line 274, the normally-opened but now-closed lower third relay switch 206c, the line 276, to the third relay operating coil 206a. The closing of the upper third relay switch 206b conditions the solenoid 182 for subsequent energization in response to the subsequent closing of the normally-open seventh switch 222.

The sixth and seventh switches are so located relatively to the cam portion 46 of the delivery and transfer cam 38 of the line casting machine 10 that when the line-casting machine's cams start on their next cycle, at the end of which cycle the slug or type line 16 cast on the previous cycle will be ejected into the galley 18, the internal cam portion 46 of the delivery and transfer cam 38 has rotated into closing engagement with the normally-open seventh switch 222, thereby completing the energization of the operating solenoid 182 by way of the line 280, the normally-open but now-closed seventh switch 222, the line 282, the normally-open but now-closed upper third relay switch 206b, the line 284, the solenoid 182 and the line 286, completing the circuit between the control current supply lines 244 and 242.

The energization of the rotary solenoid 182 in this manner swings its armature 180 in a clockwise direction, viewed from above (FIGURE 4), causing the pin 178 to shift the plunger 174 inward, compressing the compression spring 186 and moving the cam follower 190 past the guide bar 192 into the path of the inclined bar cam 124 (FIGURE 2) on the first elevator 48 of the line-casting machine 10. The downward movement of the first elevator 48 now causes the inclined bar cam 124 to engage and push the now-projected cam follower roller 190, its plunger 174, the block 170, the slide 158 and the rule-ejecting plate 160 to the right (FIGURE 5) against the tension of the tension spring 166. This action causes the rule-ejector plate 160 to push a rule 14 off the bottom of the stack thereof in the magazine 128 through the slot 134 (FIGURE 2) in the rear wall of the rule magazine 128 as shown in the dotted lines in the right-hand central portion of FIGURE 2. The lowermost rule 14, thus ejected, moves into a position with its leading edge resting upon the transverse rod 152, which serves as a fulcrum to cause its trailing edge to swing downward and plunge through the rule delivery passageway 149 of the spout 148 and into the galley 18 of the line-casting machine 10. During the travel of the rule-ejecting slide 158 to the right, the guide bar 192 (FIGURE 5) holds the cam follower roller 190 in its projected position against the inclined cam bar 124, temporarily preventing it from being retracted by the compression spring 186.

Meanwhile, as the line-casting machine delivery and transfer cam 38 continues its counterclockwise rotation in its cycle of operation, causing the internal cam portion 46 to engage and open the normally-closed sixth switch 220, and consequently opening the circuit between the lines 274 and 276. This action de-energizes the holding circuit of the third relay operating coil 206a through its lower switch 206c and line 278, permitting its upper and lower relay switches 206b and 206c to open and consequently opening the energization circuit of the operating solenoid 182 by opening the circuit between the lines 282 and 284. This, however, occurs after the rule-ejector slide 158 has started its rule-ejecting motion to the right in FIGURE 2. The cam follower roller 190, however, is held in the path of the inclined cam bar 124 by the guide bar 192 (FIGURE 5) so that it temporarily cannot be retracted, hence the slide 158 continues to be pushed to the right through its rule-ejecting travel by the continued engagement of the bar cam 124 on the first elevator 48 with the cam follower roller 190.

Figure 2:
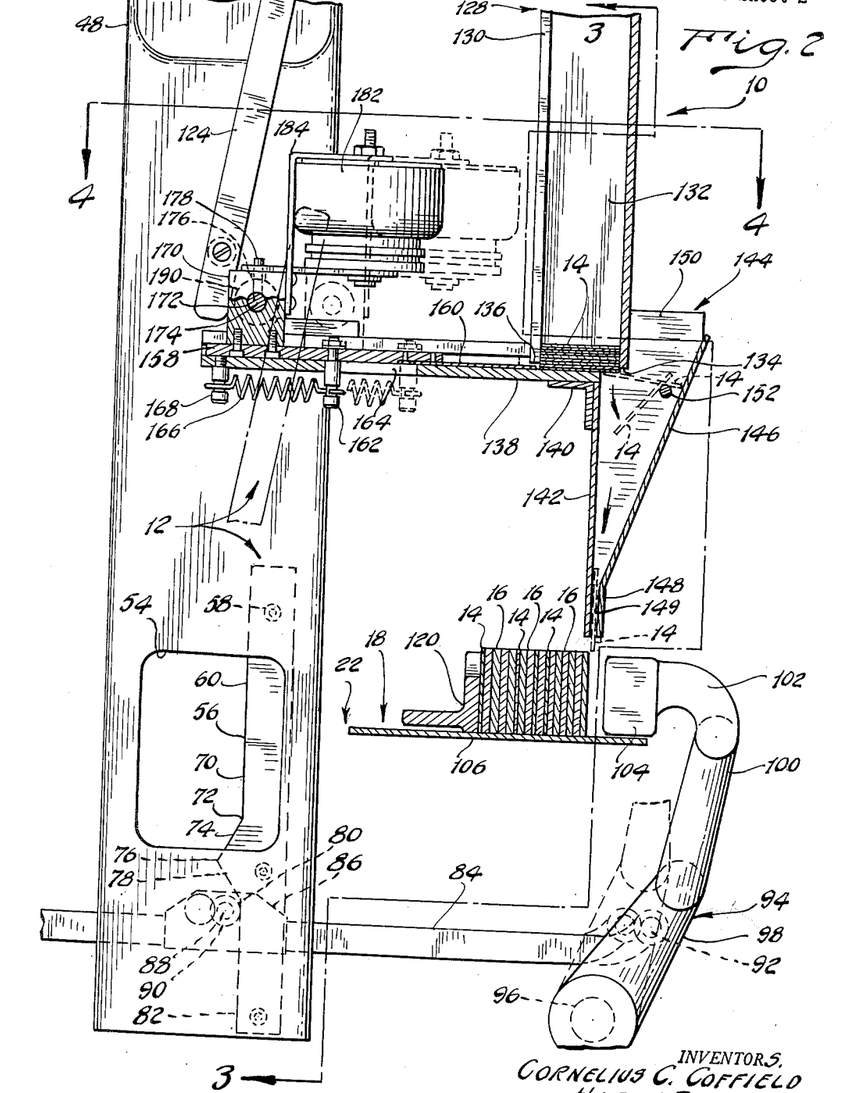
FIGURE 2 is a fragmentary vertical section through the rule-inserting device and adjacent portion of the linecasting machine of FIGURE 1, taken along the zig-zag line 2—2 in FIGURE 3.
Figure 3:
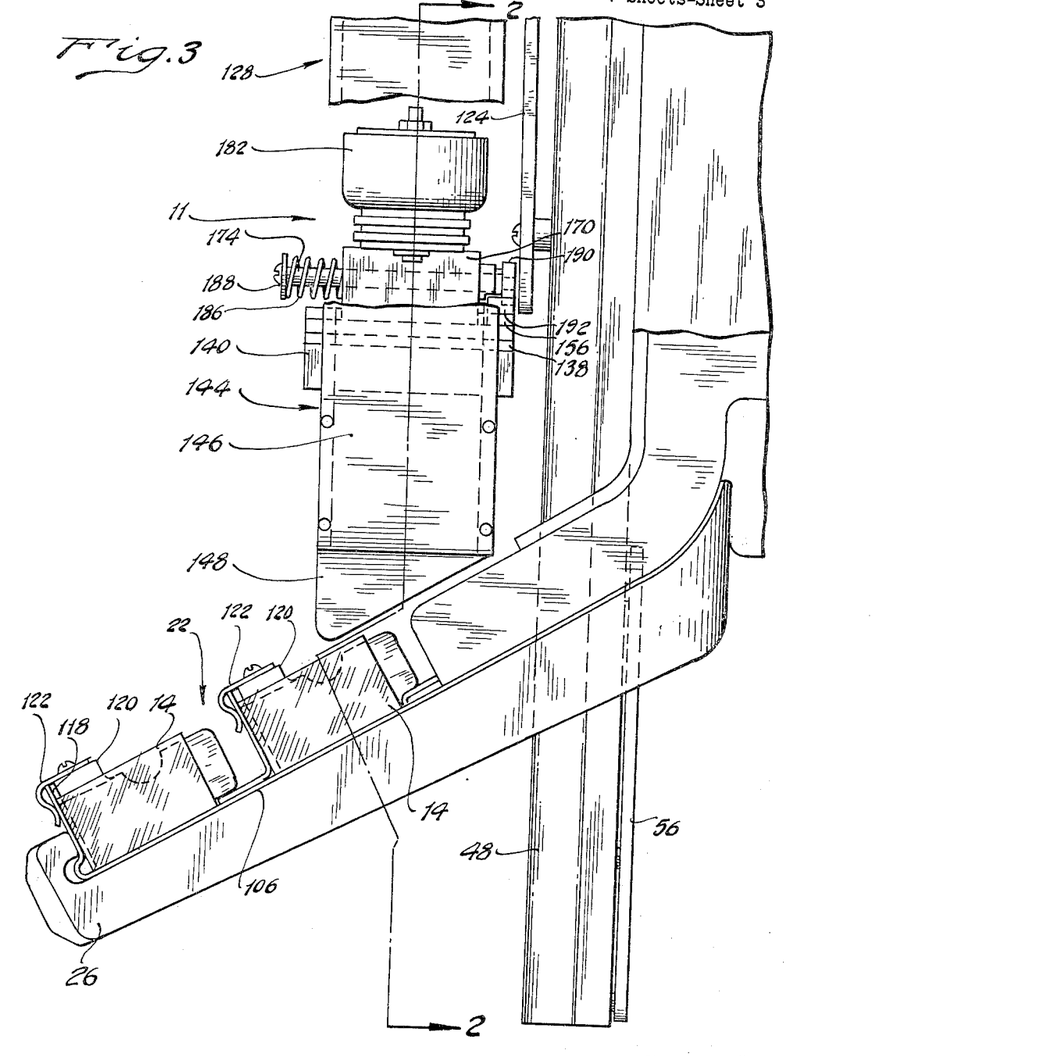
FIGURE 3 is a fragmentary right-hand end elevation of the rule-inserting device and adjacent portion of the linecasting machine shown in FIGURES 1 and 2.
Figure 4:
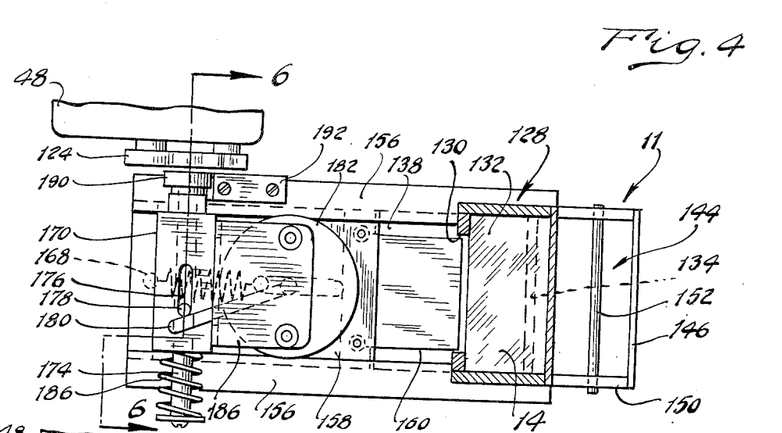
FIGURE 4 is a horizontal section taken along the line 4—4 in FIGURE 2, with the rule ejector in its retracted position.

After the first elevator 48 has completed its descent and rises, the bar cam 124 thereon moves upward away from the cam follower roller 190 (FIGURE 2), whereupon the tension spring 166 pulls the rule-ejecting slide 158 to the left from its rule-ejecting position of FIGURE 5 back to its retracted position of FIGURES 1, 2 and 4 as the roller 190 rolls against the upwardly-moving inclined bar cam 124. When the cam follower roller 190 reaches the left-hand end of the guide bar 192, it and the plunger 174 are pulled outward by the compression spring 186 from the position of FIGURE 5 to that of FIGURE 4. This withdraws the rule-ejector plate 160 from the rule magazine 128, causing the stack of rules 14 therein to drop and move another rule into the path of the rule-ejector plate 160 (FIGURE 2) for ejection upon its next stroke.

On the conventional linecasting machine 10, the slug buffer 94 possesses only one movement of pushing the horizontal stack of vertically-directed type line slugs 16 to the left one step for each machine cycle (FIGURE 2). In the present invention, the slug buffer 94 is moved to the left (FIGURE 2) each time a slug 16 or rule 14 is dropped into the galley 18. When the elongated cam 56 on the back of the first elevator 48 moves the cam follower roller 90 and slug buffer link 84 to the left each time the first elevator 48 drops to the casting position, and again moves the roll 90 and link 84 to the left as the first elevator 48 rises to the transfer position, swinging the head 104 of the slug buffer 94 to the left around its pivot shaft 96. When the linecasting machine 10 starts its cycle, the roller 90 is in engagement with the dwell portion 82 of cam 56. When the first elevator 48 descends for casting, roller 90 rides up over cam peak 76 and comes to rest on dwell portion 70, thereby giving the slug buffer 94 its first motion of adjusting the rule or spacer 14. When the first elevator rises for its "transfer" action, the roller 90 again passes over peak 76 of cam 56 moving in the reverse direction and again comes to rest on the dwell portion 82 of the cam 56, thereby giving the slug buffer 94 its second motion of adjusting the slug 16.

If the line-casting machine 10 is hand-operated, so that the Teletypesetting unit 34 with its coded tape 33 is not present or in use, the main control or bail switch 200 becomes a manually-operated switch located on the keyboard. All other functions are as described above except that the second and third switches 212 and 214 are operated in response to the movement resulting from manually raising the assembly elevator, which previously was raised by an elevator raising cam on the shaft 40 of the Teletypesetter operating unit which carries the cam wheel 36.

*Operation of Single Mold-Casting Rule-Inserting Device*

The operation of the single mold-casting rule-inserting device 32 shown in FIGURE 9 is similar to that described above for the alternate mold-casting rule-inserting device except that one of the three relays 202, 204 or 206 is omitted, specifically the second relay 204. The circuit of the first relay 202 therefore feeds into the circuit of the third relay 206 which energizes the operating solenoid 182. Accordingly, in FIGURE 9, the same reference numerals have been employed as are used in FIGURE 8, and the description of the operation is accordingly similar.

In particular, when the switch 200 in FIGURE 9 is closed, either by the Teletypesetter operating unit 34 or manually by a pushbutton switch or the like, it energizes, as before, the operating coil 202a of the first relay 202 by interconnecting the control current supply lines 242 and 244, thereby closing its normally-open switches 202c and 202b. The closing of the lower relay switch 202c closes a holding circuit from the coil 202a through the line 247, switch 202c, line 248, normally-closed second switch 212 and line 250. The closing of the upper relay switch 202b conditions the operating coil 206a of the third relay 206 for energization from the control current supply line 244 by way of the line 252, normally-open third switch 214 (about to be closed by the cam 44), line 254, the now-closed upper switch 202b, the third relay operating coil 206a and line 266 to the control current supply line 242.

Meanwhile, a line of type or slug has again been cast by the line-casting machine 10 in its normal conventional operation and the assembly elevator of the linecasting machine is again being raised by conventional mechanism including the rotary shaft 40. As the shaft 40 rotates in so doing, the cam portion 44 upon the cam wheel 36 closes the normally-open third switch 214 and immediately thereafter opens the normally-closed second switch 212. The closing of the normally-open third switch 214 now completes the energization of the third relay 206 from the control current supply line 244 by way of the line 252, now-closed third switch 214, now-closed upper relay switch 202b, line 256, third relay operating coil 206a and line 266 to the control current supply line 242, completing the circuit.

The energization of the third relay operating coil 206a, as before, closes its normally-open lower and upper switches 206c and 206b. The closing of the lower switch 206c closes a holding circuit for the third relay operating coil 206a from the control current supply line 244 by way of the line 274, normally-closed sixth switch 220, line 276, now-closed lower relay switch 206a and line 278 to the third relay operating coil 206a. Meanwhile, the rotation of cam 38 and its internal cam portion 46 closes the normally-open seventh switch 222, which energizes the solenoid 182 from the current supply line 244 by way of the line 280, now-closed seventh switch 222, line 282, now-closed upper switch 206b of the third relay 206, line 284, solenoid 182 and line 286 to the current supply line 242.

Meanwhile, the continued rotation of the shaft 40, cam wheel 36 and cam portion 44 has permitted re-opening of the normally-open third switch 214 and has opened the normally-closed second switch 212. This action, by opening the circuit between the lines 252 and 254, de-energizes the line 256, while the release of the main switch 200 has opened the energization circuit of the first relay operating coil 202a, the holding circuit of which has also been opened by the opening of the normally-closed second switch 212 by the cam 44. As a result of the energization of the operating solenoid 182 through its holding circuit 278, 206c, 276, 220 and 280, the rule 14 is ejected by the rule-ejecting device 11 in the manner described above, and is dropped into the galley 18 one line-casting machine cycle earlier than was the case in the operation of the alternate mold-casting rule-inserting circuit 30 described above in connection with FIGURES 7 and 8. The remainder of the operation of the circuit 32 shown in FIGURE 9 follows that previously described in connection with FIGURES 7 and 8 and consequently requires no repetition.

*Operation of Manually-Actuated Installation*

When the first control switch or starter switch 200 is actuated manually by a human operator rather than automatically, as by a Teletypesetter operating unit described above and shown diagrammatically in the upper-left-hand corner of FIGURE 7, the manual closing of the first control or starter switch 200 energizes the operating coil 202a of the first relay or initial relay 202, as before. The related operation of the second and third timing switches 212 and 214, however, occurs in response to the manual raising of the assembling elevator of the line-casting machine rather than by an elevator-raising cam on the shaft 40 of the Teletypesetter operating unit as described above.

Accordingly, the second and third switches are opened and closed respectively in response to manual raising of the assembling elevator rather than by the Teletypesetter operating unit. The remainder of the operation, and the sequential actions accompanying it, are otherwise substantially the same as that described above, whether for an alternate mold installation or for a single mold installation, hence appears to require no duplication of description.

What we claim is:

1. A rule-inserting arrangement for attachment to a linecasting machine equipped with first and second movable members movable in timed relationship with the casting and line slug delivery mechanisms respectively during the operating cycle of the machine, said arrangement comprising a line slug and rule receiver, a rule holder having an outlet portion disposed in rule-delivering relationship to said receiver, a rule ejector mounted for motion into an out of rule-ejecting relationship with said rule holder, an ejection starter switch adapted to be closed near the beginning of the operating cycle of the line-casting machine, and electrical means responsive in part to the closing of said starter switch and in part to the motion of said movable members for effecting motion of said rule ejector into rule-ejecting relationship with said rule holder in such timed relationship with the line slug delivery mechanism as to eject a rule from said rule holder into said line slug and rule receiver at a time immediately preceding the delivery to said line slug and rule receiver of the first line slug of a line slug assembly from which a unit of printed matter is to be printed, said electrical means including relay means conditioned for energization in response to closing of said starter switch as a result of signal-responsive actuation of said starter switch, said electrical means also including cams operatively connected to said movable members in timed operated relationship therewith, said electrical means also including timing switches adapted when operatively engaged by said cams to complete energization of said relay means and to control holding of said energization of said relay means.

2. A rule-inserting arrangement, according to claim 1, wherein said timing switches are disposed in one pair for each cam, each pair including a normally-open timing switch adapted to be closed by its respective cam and a normally-closed timing switch adapted to be opened by its respective cam.

3. A rule-inserting arrangement, according to claim 2, wherein one of said normally-open switches when closed energizes a holding circuit for said relay means upon cessation of closing of said starter switch.

4. A rule-inserting arrangement, according to claim 1, wherein said relay means includes an initial relay with energization controlled by said starter switch and a final relay with energization controlled in part by said initial relay and in part by certain of said timing switches.

5. A rule-inserting arrangement, according to claim 1, wherein said second movable member is provided with an ejector actuator and wherein said rule ejector is provided with an operating portion movable into and out of the path of travel of said ejector actuator in response to the operation of said electrical means.

6. A rule-inserting arrangement, according to claim 5, wherein said electrical means includes an electro-magnetic device controlled in controlling relationship with said operating portion for motion thereof in one direction and electrically connected in controlled relationship with the remainder of said electrical means.

7. A rule-inserting arrangement, according to claim 5, wherein mechanical means is provided for holding said operating portion temporarily in the path of travel of said ejector actuator during the rule ejection stroke thereof upon temporary de-energization of said electrical means.

8. A rule-inserting arrangement, according to claim 6, wherein resilient means is provided for moving said operating portion in a direction of retraction thereof in response to deenergization of said electro-magnetic device.

9. A rule-inserting arrangement, according to claim 1, wherein a line slug shifter is disposed adjacent said receiver, wherein motion-transmitting mechanism is disposed between said second movable member and said shifter and wherein an auxiliary motion-transmitting-mechanism operator is connected to said second movable member for travel therewith and disposed in a path of operative engagement with said motion-transmitting mechanism for additional shifting of said line slug shifter for rule insertion beyond its normal conventional shifting for line slug reception in said receiver.

10. A rule-inserting arrangement, according to claim 9, wherein the motion-transmitting-mechanism operator includes a cam operatively connected to said second movable member and movable in synchronism therewith.

11. A rule-inserting arrangement for attachment to a line casting machine having an alternate mold installation and equipped with first and second movable members movable in timed relationship with the casting and line slug delivery mechanisms respectively during the operating cycles of the machine, according to claim 4, wherein said relay means also includes an intermediate relay connected between said initial relay and said final relay and also includes a pair of intermediate circuit closers also operated by one of said circuit closer operating elements in timed relationship with one of said movable members, the energization of said intermediate relay being controlled in part by said initial relay and in part by said intermediate circuit closers, said intermediate relay in turn in part controlling the energization of said final relay.

12. A rule-inserting arrangement, according to claim 11, wherein the intermediate circuit closers are disposed operatively in advance of the circuit closers for the final relay.

13. A rule-holding and ejecting device for attachment to a line-casting machine comprising a rule magazine adapted to store a stack of line-spacing rules and having a rule outlet, a rule delivery conduit disposed adjacent said outlet, a rule ejector movable into and out of rule-ejecting relationship with said magazine, and a rule ejector actuator adapted to be operatively connected to a moving part of the line slug delivery mechanism of the line-casting machine in a path of operative engagement with said rule ejector, said rule ejector including an operating portion selectively movable into and out of engagement with said moving parts.

14. A rule-holding and ejecting device, according to claim 13, wherein said rule ejector also includes an electromagnetic motor operatively connected to said operating portion for motion thereof relatively to said rule ejector operator.

15. A rule-holding and ejecting device, according to claim 14, wherein said rule ejector also includes resilient means engaging said operating portion for motion thereof relatively to said rule ejector operator in opposition to said electromagnetic motor.

References Cited in the file of this patent

UNITED STATES PATENTS

| | | |
|---|---|---|
| 2,180,410 | Geissel | Nov. 21, 1939 |
| 2,801,734 | Schube | Aug. 6, 1957 |
| 2,872,026 | Larson | Feb. 3, 1959 |